United States Patent
Stuhrmann

(10) Patent No.: US 11,969,825 B2
(45) Date of Patent: Apr. 30, 2024

(54) METHOD FOR LASER WELDING THE END FACES OF THE JOINTS OF TWO CONNECTING FLANGES HELD IN AN ADJOINING MANNER

(71) Applicant: Kirchhoff Automotive Deutschland GmbH, Attendorn (DE)

(72) Inventor: Jan Stuhrmann, Drolshagen (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 152 days.

(21) Appl. No.: 15/561,899

(22) PCT Filed: Apr. 8, 2016

(86) PCT No.: PCT/EP2016/057760
§ 371 (c)(1),
(2) Date: Sep. 26, 2017

(87) PCT Pub. No.: WO2016/169791
PCT Pub. Date: Oct. 27, 2016

(65) Prior Publication Data
US 2018/0117712 A1    May 3, 2018

(30) Foreign Application Priority Data
Apr. 24, 2015  (DE) .......................... 102015106339.5

(51) Int. Cl.
*B23K 26/26* (2014.01)
*B23K 26/073* (2006.01)
(Continued)

(52) U.S. Cl.
CPC ............ *B23K 26/26* (2013.01); *B23K 26/073* (2013.01); *B23K 26/082* (2015.10); *B23K 26/322* (2013.01); *B23K 2103/04* (2018.08)

(58) Field of Classification Search
CPC .... B23K 26/26; B23K 26/082; B23K 26/073; B23K 26/322
See application file for complete search history.

(56) References Cited

U.S. PATENT DOCUMENTS

| 4,454,406 A | * | 6/1984 | Safonnikov | ............ B23K 25/00 219/73.1 |
| 4,832,982 A | * | 5/1989 | Mori | ....................... B22F 7/062 427/597 |

(Continued)

FOREIGN PATENT DOCUMENTS

| CN | 103056533 A | 4/2013 |
| CN | 103192149 A | 7/2013 |

(Continued)

OTHER PUBLICATIONS

Wikipedia, ZINC, https://en.wikipedia.org/wiki/Zinc.*
(Continued)

*Primary Examiner* — Thien S Tran
(74) *Attorney, Agent, or Firm* — Polson Intellectual Property Law, PC; Margaret Polson; Christopher Sylvain

(57) ABSTRACT

The invention relates to a method for laser welding the end faces of the joints (5, 6) of two connecting flanges (3, 4), which are held in an adjoining manner, of two connecting partners (1, 2) made of a steel material. According to the method, in addition to being moved in the advancement direction, which follows the longitudinal extension of the joints (5, 6), the welding laser beam (8) is moved back and forth in an oscillating manner transversely to the advancement direction. At least one of the two connecting partners (1, 2) to be welded at the connecting flange (3, 4) joints (5, 6) is equipped with a metal coating at least in the region of the respective connecting flange (3, 4). The weld pool produced by the energy input during the laser welding process is kept in a liquid state in order to allow degassing (Continued)

processes and/or distribution processes to be carried out in a controlled manner for phases of the metal coating of the at least one connecting partner, said metal coating being integrated by the welding process, wherein the welding laser beam is oscillated at a frequency of at least 80 Hz.

12 Claims, 3 Drawing Sheets

(51) Int. Cl.
*B23K 26/082* (2014.01)
*B23K 26/322* (2014.01)
*B23K 103/04* (2006.01)

(56) References Cited

U.S. PATENT DOCUMENTS

| | | | | |
|---|---|---|---|---|
| 4,924,063 | A * | 5/1990 | Buchel | B23K 26/04 219/121.64 |
| 5,187,346 | A * | 2/1993 | Bilge | B23K 26/244 219/121.84 |
| 5,603,853 | A | 2/1997 | Mombo-Caristan | |
| 6,479,786 | B1 * | 11/2002 | Fields, Jr. | B23K 26/242 219/121.63 |
| 6,521,511 | B1 * | 2/2003 | Inoue | H01L 21/2007 438/458 |
| 2001/0047983 | A1 * | 12/2001 | Degawa | B23K 26/244 219/121.64 |
| 2006/0000812 | A1 * | 1/2006 | Weber | B23K 26/0643 219/121.61 |
| 2007/0051703 | A1 * | 3/2007 | Neff | B23K 9/173 219/74 |
| 2012/0006795 | A1 * | 1/2012 | Nowak | B23K 26/26 219/121.64 |
| 2014/0076866 | A1 * | 3/2014 | Gramsch | B23K 26/244 219/121.64 |
| 2015/0314392 | A1 * | 11/2015 | Haschke | B23K 26/043 219/121.64 |
| 2017/0080523 | A1 * | 3/2017 | Andersson | B23K 26/348 |

FOREIGN PATENT DOCUMENTS

| | | | |
|---|---|---|---|
| CN | 104125872 A | | 10/2014 |
| CN | 104439702 A | | 3/2015 |
| DE | 102012104362 A1 | | 8/2013 |
| DE | 102013107228 B3 | | 4/2014 |
| DE | 102013110523 A1 | | 3/2015 |
| GB | 874271 | * | 6/1958 |
| JP | H09206969 | * | 1/1996 |
| JP | 4232024 B2 | | 3/2009 |

OTHER PUBLICATIONS

Education.jlab.org, Brian Kross, What is melting point of Steel?, https://en.wikipedia.org/wiki/Zinc.*
International Preliminary Report on Patentability, Ch. II, of the International Preliminary Searching Authority dated Jul. 11, 2017.
Schmitt, F., et al., "Laser Beam Micro Welding With High Brilliant Fiber Lasers", Journal of Laser Micro/Nanoengineering, vol. 5, No. 3, pp. 197 to 203, Dec. 1, 2010.
Mehlmann, B., et al., "Laser micro welding for ribbon bonding", Physics Procedia, vol. 56, pp. 776 to 781, Jan. 1, 2014.
Muller, A., et al., "Laser beam oscillation for fillet welding", Welding in the World, vol. 58, No. 6, pp. 865 to 872, Nov. 1, 2014.
Office action dated Nov. 22, 2017 in related Canadian application 2983381. 10 pages.
Office Action dated Mar. 4, 2019 in related Chinese application CN201680021696.3.
Intention to Grant dated Apr. 12, 2019 in related European application 16715519.1.
Office Action dated Mar. 5, 2020 in related Chinese application CN201680021696.3.
Office Action dated Aug. 25, 2020 in related Chinese application CN201680021696.3.

* cited by examiner

METHOD FOR LASER WELDING THE END FACES OF THE JOINTS OF TWO CONNECTING FLANGES HELD IN AN ADJOINING MANNER

BACKGROUND

The present disclosure relates to a method for laser welding the end faces of the joints of two connecting flanges, which are held in an adjoining manner, of two connecting partners made of a steel material. In addition to being moved in the advancement direction which follows the longitudinal expanse of the joints, the laser welding beam is moved back and forth in an oscillating manner transversely to the advancement direction. Such types of laser welds are undertaken at numerous joining locations of car body components for example.

There are numerous applications in which the end faces of connecting flanges of metal components, which are held against one another at their flat sides, are welded to one another at their joints—the end faces of the connecting flanges that run parallel to one another. In many cases, laser welding is used for this purpose. The connecting flanges of the connecting partners can be end regions that border one another and follow the longitudinal expanse of the connecting partners, for example end regions of sheet-metal workpieces or regions of such a workpiece that are bent or crimped specifically in order to form the connecting flanges. In order to be able to undertake welding of the end faces, the connecting flanges are fixed to one another in a suitable manner, for example by a clamping device until the weld has been completed.

Laser welding of the end faces of two connecting partners is known from DE 10 2013 107 228 B3, wherein the connecting partners are steel components. In the laser welding method of this document, central region of the weld is supplied with an introduction of lesser energy, and the edge regions that border on it and are situated within the joints are supplied with an introduction of greater energy. In order to be able to undertake the welding over the desired joint width, the laser welding beam is moved back and forth in an oscillating manner transversely to the advancement direction. In this previously known method, the laser welding beam movement is also utilized to introduce the different energy amounts required over the cross-section of the weld, specifically in that either the dwell time is extended and/or the energy of the laser beam is increased in the edge regions of the weld where the weld is supposed to be undertaken with a greater introduction of energy. In this way, the result is achieved that the welding zone can be introduced relatively deeply into the joints.

Stitch welding seams can be produced by superimposition of a transversely directed component on the main advancement direction, which corresponds to the longitudinal expanse of the weld seam to be produced, as described in DE 10 2012 104 362 A1. Using this method, it is necessary to preheat the connecting partners in a region of the seam to be produced. The process of welding then follows, and this in turn is followed by a step of post-heating.

In the two aforementioned documents, the oscillation amplitude can be adapted to the geometry of the connecting partners, for example their thicknesses, their materials and/or their coatings.

It is often problematical in welding sheet-metal components, including in the vehicle body sector, if the sheet-metal components are provided with a metal coating. This metal coating can be a corrosion-inhibiting coating, for example a zinc coating. Typically, such a zinc coating is applied using hot-dip galvanization or electrolytic zinc plating. To reduce scale formation during further processing by a press hardening process, sheet-metal components are sometimes also provided with an AlSi coating, wherein such a coating is typically applied by hot dipping to the semi-finished product to be shaped. It is often problematical in the joining of workpieces carrying a metallic coating that the melting temperatures of the coating differ significantly from the melting temperature of the steel material. While the melting point of some zinc coatings provided for such purposes lies below the melting temperature (joining temperature) of steel, the melting temperature of an AlSi coating lies higher. This has the consequence that when welding two workpieces, where at least one of the connecting partners has a zinc coating, this coating is more or less explosively evaporated as a result of the heat required for welding. In such a case, this occurrence is known as zinc degassing. The results of zinc degassing are increased formation of splatters, carrying away of parts of the molten weld pool, as well as increased porosity in the weld seam. In this regard, such a weld seam may not meet the strength requirements otherwise demanded of the welded component, particularly if dynamic stress is involved. In contrast, in the case of a workpiece having an AlSi coating provided on at least one of the connecting partners, the formation of intermetallic phases, which accumulate on the weld line and on the weld seam root, cannot be prevented during welding. These intermetallic phases demonstrate brittle material behavior and are the starting point for failure of the welded connecting partners under stress. Therefore, such a weld seam also may not meet the strength requirements demanded of the workpiece.

In the case of a component composed of two or more workpieces that are joined together, one could consider applying a zinc coating, if it is desired, only after the connecting partners have been joined together. However, because of the complicated geometry of the component produced in this manner, this process is laborious and, in particular, very much more laborious than applying a zinc coating to individual workpieces, particularly ones that have not yet been shaped, in other words when they still have the form of an unshaped plate. Furthermore, if the component composed of multiple workpieces has cavities, a zinc coating in the cavities, as intended, cannot be guaranteed without significant additional measures. In the case of an AlSi coating, it is often not possible to consider subsequent coating since the workpieces are generally shaped by press hardening, for which this coating is required, before being joined together.

The foregoing examples of the related art and limitations therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

Proceeding from this background, for the production of components for the construction of bodies of motor vehicles (where components are particularly susceptible to corrosion caused by the effects of moisture and salt), it would therefore be desirable to have a welding method for joining together workpieces provided with a metal coating wherein the end faces of these workpieces can be welded at their joints without the corresponding disadvantages described above with regard to the state of the art. This also holds true for other applications. An aspect of the present disclosure proposes such a welding method.

According to the present disclosure, a method is provided for laser welding end faces in which at least one of the two connecting partners to be welded at the joints of their connecting flanges has a metal coating, at least in the region of its connecting flange, wherein the weld pool that forms due to the introduction of energy during laser welding is kept liquid for the controlled occurrence of degassing processes and/or distribution processes of phases of the metallic coatings of the at least one connecting partner formed during welding, in that the oscillation of the laser welding beam takes place at a frequency between 80 Hz and 1000 Hz.

In this method for laser welding the end faces of the joints of at least two connecting flanges that are held to one another, it is presumed that the weld pool remains liquid longer, as compared with conventional welding methods of the stated type, because of the high oscillation frequency, wherein it is practical if the laser oscillation is undertaken in sine shape. Furthermore, certain dynamics are introduced the laser welding beam that is oscillating at high frequency, and the corresponding introduction of energy into the weld pool, which energy correspondingly oscillates at high frequency. As a result of this, degassing processes of metallic coatings that have a lower melting temperature than that of the steel material to be welded will take place preferentially, without the weld pool or parts of the same having previously hardened. This leads to pore-free weld seams. Keeping the weld pool liquid longer, as well as the dynamics introduced into the pool, support degassing processes in this regard such that the formation of weld spatters is also reduced. In the case of a metal coating that does not yet degas at the weld temperatures that are used, for example an AlSi coating, the measures described above also ensure that the intermetallic phases that form are dispersedly distributed within the weld pool, and, in contrast to previously known welding methods, do not accumulate locally. If the intermetallic phases are dispersedly distributed, they do not impair the desired strength properties.

Because of the high-frequency oscillation of the laser welding beam, the weld pool is typically kept liquid over the entire width of the weld seam to be produced. The advancement direction of the laser welding beam is adapted to the introduction of energy by the laser welding beam, in order to configure the weld pool in the manner described. It is understood that the advancement speed is not allowed to be too high. Because of the high-frequency oscillation of the laser welding beam, welding according to this method can be carried out at conventional advancement speeds. Production of a weld pool that extends over the width of the desired weld seam, and furthermore keeping the weld pool liquid longer, also has the advantage that the weld seam itself is configured in a much more homogeneous manner as compared with conventional weld seams.

In this method according to the present disclosure, the seam connection width is also increased because the weld pool is kept liquid longer and because of the high-frequency oscillation of the laser beam transversely to the connecting direction. This in turn has a positive effect on compensation of the thickness variations in the joints of the workpieces to be connected. Furthermore, this measure may ensure that the set weld depth also reflects the actual connection depth of the connecting partners.

In some embodiments of this method, in order to prevent parts of the weld pool from flowing away in uncontrolled manner, it may be provided that an edge region of each of the joints of the connecting flanges to be connected that faces away from the other connecting flange, in each instance, is not melted, at least in the region of the weld seam root. These edge regions of the joints then form weld pool delimitation walls. However, it is also conceivable that the upper end of the connecting flange can be melted completely.

Laser welding of end faces, in the manner described, also makes use of the circumstance that the joints form a material reservoir for forming the melt, without having to fear that a hole will be burned into one of the connecting partners due to the introduction of energy. Therefore this method is also suitable for welding workpieces composed of high-strength steels having only a slight wall thickness in order to reduce the weight of the component to be produced from them. Because of the controlled degassing in the case of at least one connecting partner having a metallic coating, the melting temperature of which lies below the steel melting temperature, the height of the connecting flange (in other words the weld pool material specification) can be selected to be lower, as compared with the required height of the connecting flange in previously known laser welding methods for end faces since a safety zone that extends in this direction, from which zone portions of the steel material can also be torn away by degassing of the coating, does not have to be maintained. In this regard, if the workpieces to be connected are designed appropriately, the height of the connecting flanges can be dimensioned in such a manner that they are used more or less completely for forming the weld pool. Therefore, the connecting flanges, when these are bent or crimped away from the actual expanse of the workpiece, may project away from the remaining surface of the component produced from the workpieces only to the height of the weld seam.

With an increased oscillation frequency, more dynamic energy is introduced into the weld pool, and this promotes the processes described above within the weld pool during welding. For this reason, some embodiments of the method may be carried out at an oscillation frequency of more than 100 Hz. A frequency of more than 1000 Hz, or in some cases 900 Hz, is not considered to be necessary, since no further supporting influence in the sense described above can be expected at these frequencies. In certain embodiments, a laser welding beam oscillation of 250 to 450 Hz is considered to be particularly advantageous, and also with regard to the required mechanics for the corresponding guidance of the laser beam.

The oscillation movement of the laser beam may take place using a correspondingly-oscillating light-guiding element, for example a mirror or a prism, by means of which light-guiding element the laser welding beam is directed onto the joints of the connecting flanges of two or even more connecting partners to be welded to one another. The oscillation movement of the laser welding beam is provided, according to one embodiment, via the corresponding oscillating pivoting of such a light-guiding body. This also allows for the particularly simple adjustment of the amount of oscillation if desired. It is understood that the amount of oscillation of the laser beam can be set up for the joints to be connected with one another, specifically by a corresponding adjustment of the spacing of the surface of the joints to be connected, in the direction of or opposite to the direction of the laser welding beam.

In order to further promote degassing of a metallic coating of one or both connecting partners, it may also be provided to gradually undertake heating of the joint surfaces in order to form the weld pool. This is done by preheating the joints of the connecting flanges to be connected, specifically in such a manner that the coating is brought to its evaporation temperature or slightly above it via the preheating, before the actual welding energy is introduced into the connecting partners which then leads to melting of the steel material. Degassing of the metallic coating decisively takes place when carrying the welding method out with such preheating, even before actual melting of the steel material. Preferably, the degassing process is thereby concluded, at least to a great extent, before the much greater introduction of energy required to form the weld pool is introduced. Such preheating can be undertaken, for example, by uncoupling part of the laser welding beam and applying the uncoupled partial beam to the joints to be connected, in advance of the actual laser welding beam. Optical light-guiding elements can be used for uncoupling such a partial laser beam that serves for preheating. Such light-guiding elements or bodies are sufficiently known. It is understood that because of the preheating, the coated connecting flange or flanges only have to be brought to the degassing temperature of the metallic coating at their surface. Studies have shown that preheating of the joints of the connecting flanges to be connected also supports the degassing process if the surface provided with a metallic coating is not heated all the way to its degassing temperature, even if this might be preferred. As a consequence of the gradual heating of the metallic coating, such preheating also results in this coating not being heated too suddenly when the energy required for welding is introduced.

Preheating can also be undertaken, without uncoupling a partial laser beam from the laser welding beam as described above, by inclining the laser welding beam relative to the vertical line or plane of the end face of the joints, for example between 5 and 45 degrees. In some embodiments, an inclination in this regard amounts to more than 20 degrees. Because of this inclination, the laser welding beam pushes a heat front ahead of itself. Studies have shown that effective preheating for controlled degassing in the case of coated connecting partners takes place with such welding parameters.

The extent of degassing processes of metallic coatings during joining is also dependent on the coating thickness. Excellent welding results were achieved with the disclosed welding method and on the basis of the accompanying welding parameters, even in the case of zinc coatings that correspond to what is maximally usual at present, 140 g/m$^2$.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

The present disclosure will be described in greater detail below using the accompanying figures, which include.

Before further explaining the depicted embodiments, it is to be understood that the invention is not limited in its application to the details of the particular arrangements shown, since the invention is capable of other embodiments. It is intended that the embodiments and figures disclosed herein are to be considered illustrative rather than limiting. Also, the terminology used herein is for the purposes of description and not limitation.

DETAILED DESCRIPTION

Figure 1:
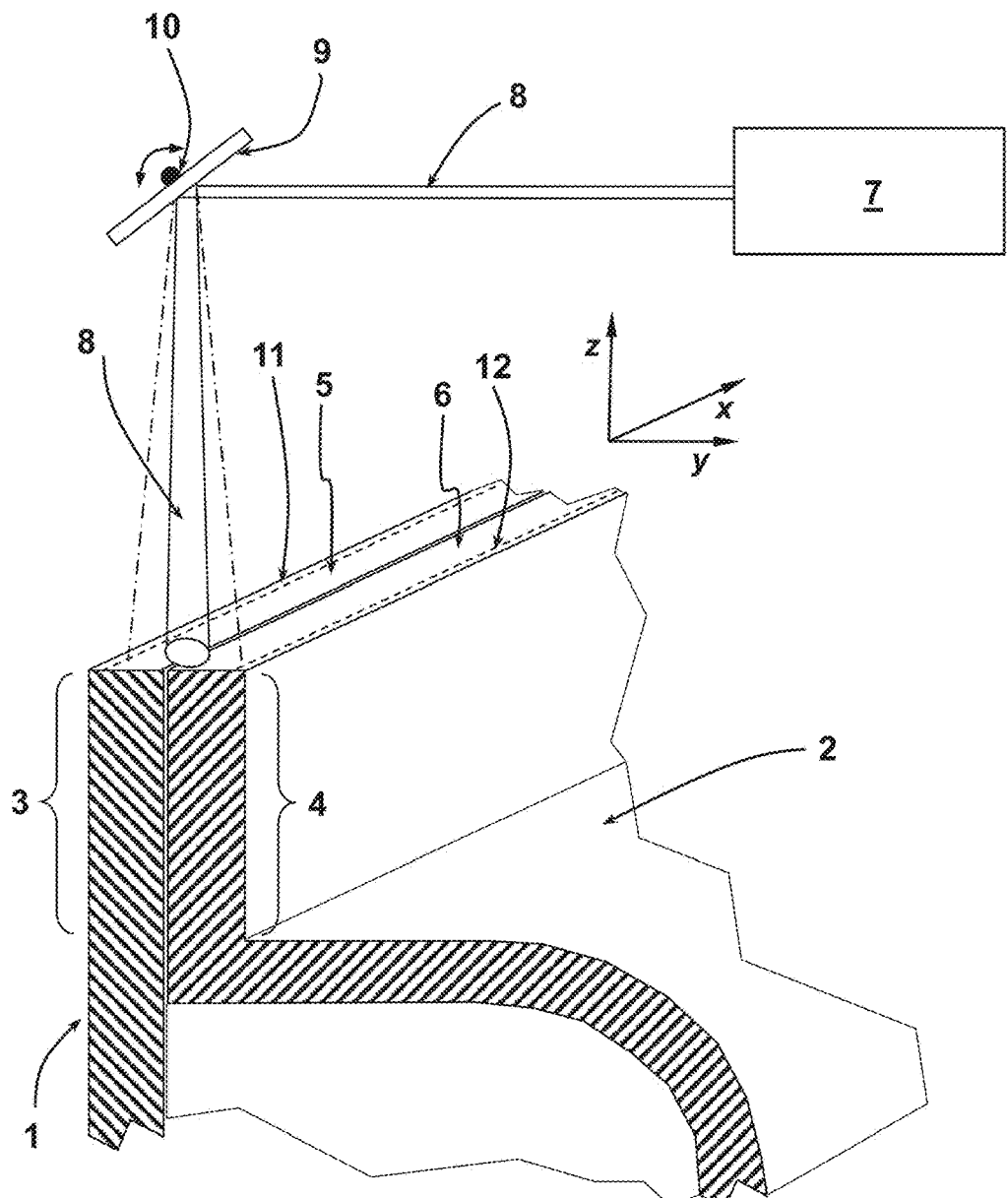
FIG. 1: a schematic representation of laser welding according to the present disclosure of the end faces of the joints of two connecting flanges of two connecting partners, held in an adjoining manner.

FIG. 1 shows two steel workpieces 1, 2 as connecting partners. The workpieces 1, 2 each have a connecting flange 3, 4. The connecting flanges 3, 4 form a joint 5, 6, in each instance, with their upper end shown in FIG. 1. In the case of the workpiece 1, the connecting flange 3 is an edge region of the workpiece, designed as a metal sheet. In the case of the workpiece 2, the connecting flange 4 is provided by a bending process. Both workpieces 1, 2 are produced from a high-strength steel alloy. The workpiece 2 has been brought into its form shown in FIG. 1 by a press hardening step. The workpiece 2 carries an AlSi coating in order to optimize the prior press hardening process. In the illustrative embodiment shown in the figures, the workpiece 1 has a zinc coating, specifically with an application of 140 g/m$^2$.

The two workpieces 1, 2 are to be connected with one another by a weld carried out on the end faces of the joints 5, 6. For this purpose, the connecting flanges 3, 4 are held against one another accordingly as depicted in FIG. 1, specifically by a holding or clamping device not shown in the figures. The weld seam to be formed follows the longitudinal expanse of the joints 5, 6. In FIG. 1, this direction is indicated as the x direction. Accordingly, the connecting flanges 3, 4 are held against one another with their flat sides that face one another, for the purpose of the welding process.

The joints 5, 6 are welded to one another by a laser 7, the laser welding beam 8 of which is applied to the joints 5, 6 of the connecting flanges 3, 4 by way of a mirror 9 acting as a light-guiding element. The mirror 9 is mounted so as to pivot about a pivot axle 10. The laser welding beam 8 can be adjusted transversely to the advancement direction (x direction) by the mirror 9. This is necessary in order to be able to include a sufficient width of the joints 5, 6 in the weld pool formation. Therefore the mirror 9 serves to produce oscillating back and forth movement of the laser welding beam 8 in they direction. In the embodiment shown, the amount of pivoting of the mirror 9 is predetermined. The surface region of the joints 5, 6 covered by the laser welding beam 8 as it moves back and forth can therefore be established by setting the distance between the joints 5, 6 (and thereby of the workpieces 1, 2) from the mirror 9. It is understood that the greater the distance of the joints 5, 6 from the mirror 9, the larger the region covered by the laser welding beam 8.

Sufficient energy is introduced into the connecting flanges 3, 4 by way of the laser welding beam 8 so that the steel material can be melted to form a weld pool.

Figure 2:
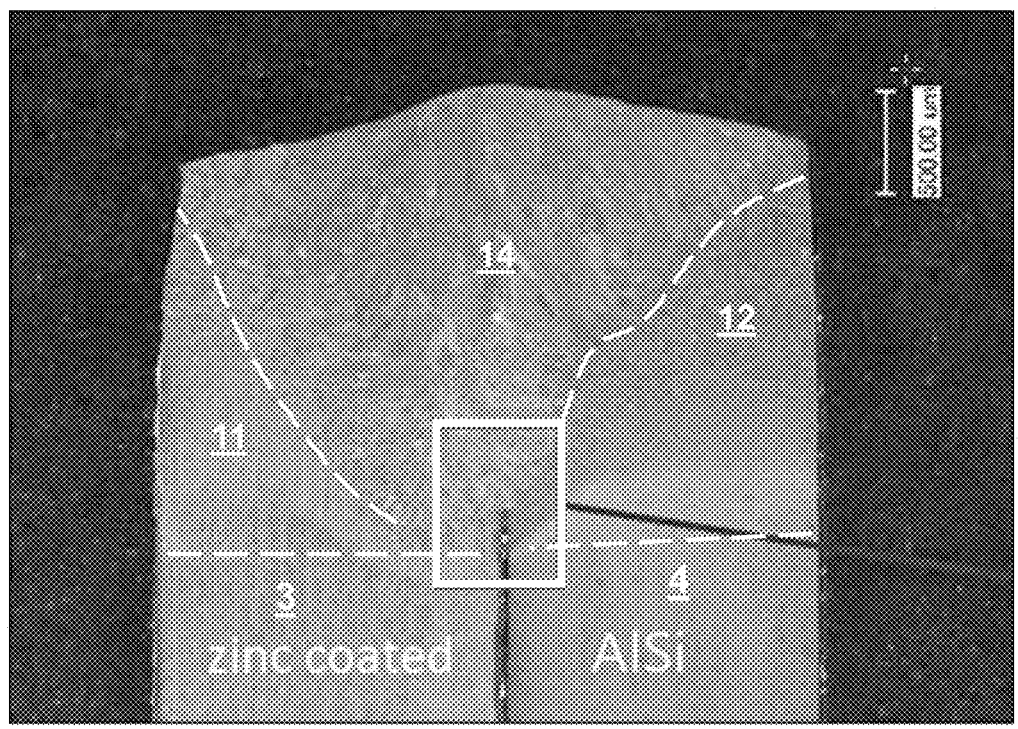
FIG. 2: a micrograph through an end face weld seam produced using the method according to the present disclosure.

In the embodiment shown, laser welding is carried out with a defocused laser spot diameter. Defocusing of the laser welding beam 8 and the amount of the laser beam movement in the y direction will be adapted to one another. In the case of the welding method described, the laser beam 8 is moved back and forth in the y direction, in oscillating manner, at about 300 Hz. Accordingly, the mirror 9 must be pivoted in oscillating manner. In this regard, defocusing takes place in order to cover the widest possible region of the joints 5, 6 and to optimize the introduction of energy at this location with regard to the introduction depth of the coated system. Accordingly, a larger surface area is processed at the same power, with a lower power density, by means of the defocusing. In other words, the connecting partners and the coating are melted more slowly and more uniformly, thereby causing the welded connection to be better configured and also causing fewer material spatters to occur. In the embodiment shown, the laser welding beam 8 is defocused in such a manner that its beam diameter corresponds to approximately the minimal sheet-metal thickness of a connecting partner when it impacts the surface of the joints 5, 6. Furthermore, in connection with the welding process, it may be provided that the connecting flanges 3, 4 are not completely melted to form the weld pool, but rather that an edge section that faces away from the respective other connecting flange, in each instance, remains in place at least in the region of the weld seam root or is included in the weld pool formation only to a slight extent. In FIGS. 1 and 2, these edge regions are identified with the reference symbols 11, 12. These edge sections 11, 12 extend parallel to the advancement direction (x direction). These edge sections form weld pool delimitation walls when the other components of the connecting flanges 3, 4 have melted to form a weld pool. The melt is prevented from flowing away to the side by these remaining weld pool delimitation walls, at least in the region of the weld seam root.

Figure 1A:
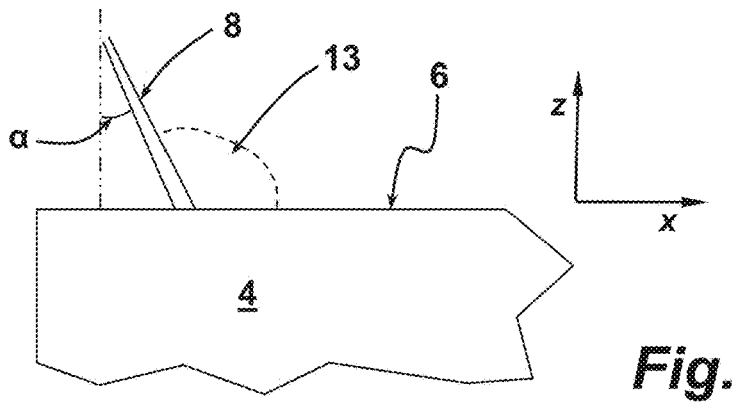
FIG. 1a: a partial side view of the connecting partner on the right in FIG. 1.

In the embodiment of the depicted welding arrangement as seen in FIG. 1*a*, the laser welding beam 8 is not directed perpendicular to the joints 5, 6, but rather inclined in the advancement direction (x direction). The advancement direction of the laser welding beam 8 is inclined to the right in FIG. 1. The angle of inclination a between the vertical and the laser welding beam 8 is about 35 degrees in the welding arrangement shown. In this way, the result is achieved that a heat front 13 forms in the advancement direction, which front 13 lies ahead of the impact of the actual laser welding beam 8 on the joints 5, 6, such that preheating of the joints 5, 6 and of the connecting flanges 3, 4 occurs. Preheating serves the purpose of preheating the zinc coating of the connecting flange 3, preferably up to its degassing temperature, before the laser welding beam 8 melts the steel material that lies underneath. This supports a controlled zinc degassing process, as the degassing itself is ultimately not preventable.

During the welding process of the depicted embodiment, the laser welding beam 8 oscillates in the y direction, and thereby transversely to the advancement direction, at about 300 Hz. This melts the connecting flange regions that lie outside of the edge regions 11, 12, thereby forming the weld pool. Such high-frequency oscillation of the laser welding beam 8 results in the weld pool being liquid over the entire width of the weld and remaining liquid over a certain period of time. Furthermore, certain dynamics are coupled into the weld pool by the oscillating introduction of energy, and this not only supports the zinc degassing process, but rather also ensures that the AlSi phases formed during welding because of the AlSi coating of the connecting flange 4 are dispersedly distributed in the weld pool and in the solidified weld seam that results from it. The movement of the laser welding beam 8 in the advancement direction is adapted for having the weld pool remain liquid for a sufficiently long time.

In some embodiments, weld pool dynamics may further be coupled into the weld pool by coupling an ultrasound head onto one of the two connecting partners. Fundamentally, however, it may be sufficient that certain dynamics are introduced into the weld pool by the high-frequency oscillation of the laser welding beam in the y direction.

With respect to the movement in the y direction described above in connection with the oscillation movement direction of the laser welding beam 8, it is understood that the laser welding beam does not have to oscillate strictly transversely and therefore at 90 degrees relative to the advancement direction (x direction) in order to obtain the advantages of this disclosed welding method. The expression "transversely to the advancement direction" used within the scope of this explanation should be understood to mean any oscillation direction of the laser welding beam that runs at an angle to the advancement direction, particularly runs at more than 45 degrees relative to it.

Figure 3:
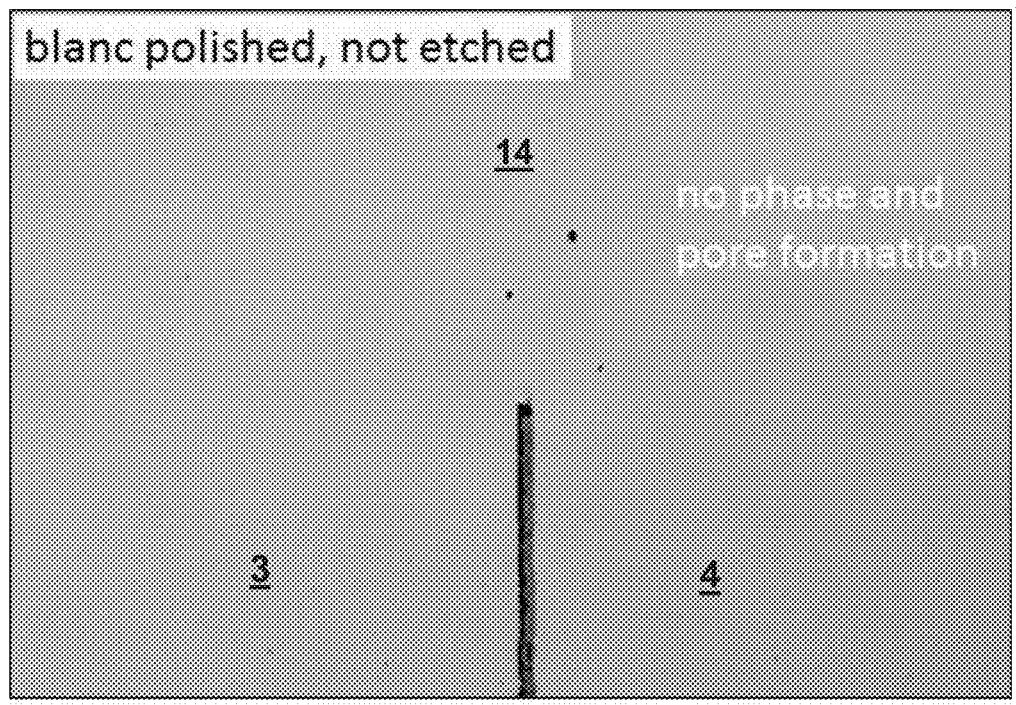
FIG. 3: a micrograph of a detail of the weld seam shown in FIG. 2.

A micrograph of the weld seam configured according to the present disclosure is shown in FIG. 2. The photograph impressively shows the very homogeneous crystallographic configuration of the weld seam connecting the two connecting flanges 3, 4. In this photograph, the weld seam is identified with the reference symbol 14. Intermetallic phases are not evident. Rather, microscope studies have shown that the intermetallic phases present on the connecting flange 4 coated with AlSi are dispersedly distributed in the weld seam 14. FIG. 3 shows the region of the weld seam 14 enclosed in a white box in FIG. 2, after it has been polished to shine and not etched. No intermetallic phases or pores are evident.

Figure 4:
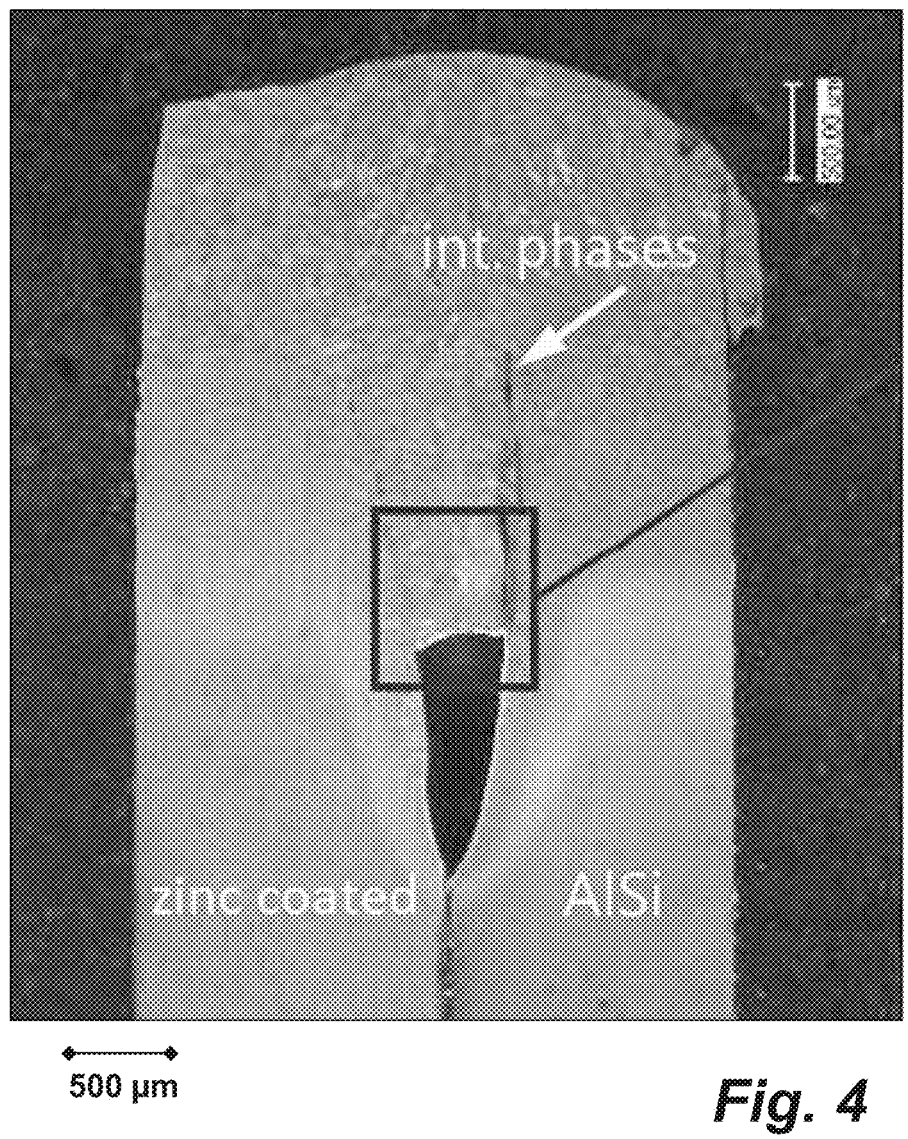
FIG. 4: a micrograph of a weld seam produced using a conventional end face laser welding method.

FIG. 4 shows, in comparison, a photograph of a weld seam corresponding to that of FIG. 2 but produced using conventional end face laser welding. The differences in the configuration of the weld seam are significant. In the weld according to FIG. 4, parts of the connecting flanges have been carried away as the result of uncontrolled zinc degassing. This is the reason for the formation of the cavity below the weld seam. A collection of intermetallic phases formed as a straight line can furthermore be seen in the region of the melt boundary of the connecting flange coated with AlSi, proceeding from the root of the weld seam. Both the uncontrolled zinc degassing and the accumulation of the intermetallic phases, which, in contrast to the object of the method according to the present disclosure, are evidently not dispersedly distributed in the melt, lead to the result that such weld seams may not satisfy the strength requirements set for such a weld seam.

The welding method disclosed herein is suitable for a great number of applications. In the automotive sector, metallically-coated connecting partners can be joined together in a cost-advantageous manner by this method, for example to form bumper crossbars, in which press-hardened crossbars are provided with zinc-plated locking plates, or if zinc-plated engine mounts or transmission mounts are supposed to be welded, or if zinc-plated chassis parts are supposed to be welded to other parts—with or without a zinc coating or with or without an AlSi coating.

The invention has been described with reference to embodiments. Without departing from the scope of the claims, many other embodiments are apparent to a person skilled in the art, allowing the same to implement the invention. While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the invention.

REFERENCE SYMBOL LIST 1 workpiece
2 workpiece
3 connecting flange
4 connecting flange
5 joint
6 joint
7 laser
8 laser welding beam
9 mirror
10 pivot axle
11 edge region
12 edge region
13 heat front
14 weld seam
α angle of inclination

The invention claimed is:

1. A method for laser edge welding the end faces of the joints of two connecting flanges held in an adjoining manner of two connecting partners made of a steel material, wherein at least one of the connecting partners has a metal coating at least in the region of its connecting flange, the metal coating having a lower melting temperature than the steel material, the method comprising:

moving a laser welding beam in an advancement direction which follows the longitudinal expanse of the joints, the laser welding beam directed downwardly onto the end faces of the two connecting flanges, wherein each connecting flange has two side faces which face in opposite directions and which terminate at the end face of the connecting flange, with the end face extending between the two side faces, and wherein one of the side faces of each connecting flange is positioned facing one of the side faces of the other connecting flange, with the end faces of the two connecting flanges positioned adjacent each other in a plane facing upward;

oscillating the laser welding beam back and forth transversely to the advancement direction at a frequency between 100 Hz and 1000 Hz to melt material of the ends faces of the two connecting flanges and to keep a weld pool that forms due to the introduction of energy during laser welding liquid until degassing is completed, whereby the weld pool is kept liquid by dynamic energy introduced into the weld pool due to the oscillation frequency of the laser welding beam that impacts the joints, whereby a continuous weld seam is produced along the longitudinal expanse of the joints.

2. The method of claim 1, wherein the laser welding beam oscillates at more than 250 Hz.

3. The method of claim 1, wherein an edge region of each joint facing away from the other connecting flange is not melted at least in a region of a weld seam root, the edge regions of the joints thereby forming weld pool delimitation walls.

4. The method of claim 1, wherein regions of the joints to be melted are gradually preheated before introduction of the energy required for melting.

5. The method of claim 4, wherein the laser welding beam is inclined in the advancement direction relative to the vertical to the end faces of the joints.

6. The method of claim 5, wherein the angle of inclination of the laser welding beam is between 5 degrees and 45 degrees.

7. The method of claim 4, wherein a part of the laser welding beam is uncoupled by an optical system for preheating of regions of the joints to be melted, and the part of the laser welding beam uncoupled for preheating is guided to move ahead of the laser welding beam in the advancement direction.

8. The method of claim 1, wherein the metal coating of the at least one connecting partners is a zinc coating applied using hot dipping or electrolytic zinc plating.

9. The method of claim 8, wherein the application of the zinc coating is at least 100 g/m$^2$.

10. The method of claim 1, wherein the metal coating of the at least one connecting partners is an AlSi coating.

11. The method of claim 1, wherein the two connecting partners each have the same metal coating.

12. The method of claim 1, wherein the two connecting partners each have a different metal coating.

* * * * *